(12) United States Patent
Cirligeanu

(10) Patent No.: US 11,300,048 B2
(45) Date of Patent: Apr. 12, 2022

(54) ARRANGEMENT OF TWO TURBOSHAFT ENGINES

(71) Applicant: SAFRAN, Paris (FR)

(72) Inventor: Radu Cirligeanu, Moissy-Cramayel (FR)

(73) Assignee: SAFRAN, Paris (FR)

( * ) Notice: Subject to any disclaimer, the term of this patent is extended or adjusted under 35 U.S.C. 154(b) by 176 days.

(21) Appl. No.: 16/625,405

(22) PCT Filed: Jun. 19, 2018

(86) PCT No.: PCT/FR2018/051466
§ 371 (c)(1),
(2) Date: Dec. 20, 2019

(87) PCT Pub. No.: WO2018/234684
PCT Pub. Date: Dec. 27, 2018

(65) Prior Publication Data
US 2021/0332751 A1    Oct. 28, 2021

(30) Foreign Application Priority Data

Jun. 22, 2017    (FR) ...................... 17 55718

(51) Int. Cl.
*F02C 6/02*    (2006.01)
*F02C 3/10*    (2006.01)
*F02C 6/18*    (2006.01)
*F02C 7/10*    (2006.01)

(52) U.S. Cl.
CPC ................ *F02C 6/02* (2013.01); *F02C 3/10* (2013.01); *F02C 6/18* (2013.01); *F02C 7/10* (2013.01); *F05D 2220/32* (2013.01); *F05D 2220/74* (2013.01); *F05D 2240/60* (2013.01)

(58) Field of Classification Search
None
See application file for complete search history.

(56) References Cited

U.S. PATENT DOCUMENTS

| 2,814,181 | A | 11/1957 | Schwartz | |
| 3,032,989 | A | 5/1962 | Oprecht | |
| 2016/0003144 | A1 | 1/2016 | Kupratis | |
| 2016/0273396 | A1* | 9/2016 | Ekanayake | ............... F02C 6/08 |
| 2018/0010476 | A1* | 1/2018 | Brostmeyer | ............... F02C 9/20 |
| 2018/0073437 | A1* | 3/2018 | Simonetti | ............... F01D 13/00 |
| 2018/0080378 | A1* | 3/2018 | Alecu | ....................... F02C 9/42 |

FOREIGN PATENT DOCUMENTS

| EP | 2 963 247 A1 | 1/2016 |
| FR | 824 080 | 2/1938 |

OTHER PUBLICATIONS

International Search Report dated Sep. 6, 2018 in PCT/FR2018/051466 filed on Jun. 19, 2018, 2 pages.
French Preliminary Search Report dated Feb. 27, 2018 in French Application 1755718 filed on Jun. 22, 2017.

* cited by examiner

Primary Examiner — Jason H Duger
(74) Attorney, Agent, or Firm — Oblon, McClelland, Maier & Neustadt, L.L.P.

(57) ABSTRACT

Two turboshaft engines are interwoven so as to exchange thermal energy by heat exchangers which improve their efficiency, without greatly increasing head losses since the pipes imposed to serve the exchangers are short and include a single bend.

7 Claims, 5 Drawing Sheets

ARRANGEMENT OF TWO TURBOSHAFT ENGINES

BACKGROUND OF THE INVENTION

Field of the Invention

The subject of the invention is an arrangement of two turboshaft engines.

Description of the Related Art

Certain turboshaft engines, referred to as "recuperated turboshaft engines" are known, the efficiency whereof is increased by a heat exchanger which recuperates part of the heat energy of the exhaust gases. In a known design shown in FIG. 6, the heat exchanger 1 is disposed in the cold section of the flow of the turboshaft engine upstream of the combustion chamber 2, for example between a high-pressure compressor 3 and this chamber. The combustion gases then circulate within a hot section comprising turbines 4 and a pipe 5 at the outlet of the turbines. The compressed gas stream receives energy from the exhaust gases by passing the pipe 5 via the heat exchanger 1, and thus undergoes preheating before reaching the combustion chamber 2. However, the path of the gases in the pipe 5 must be diverted and elongated in order to pass said gases in front of the combustion chamber 2 of the machine, which imposes a significant increase in the head losses and reduces the expected increase in efficiency for the turboshaft engine.

The same drawback of complicating the path of the gases and of increasing head losses can be attributed to designs similar to that described hereinabove, wherein (with reference to FIG. 7) the heat exchanger 1 is located at the exhaust immediately after the turbines 4, or (with reference to FIG. 8) the heat exchanger 1 is placed beside the machine: in the first of these designs, the compressed air originating from the high-pressure compressor 3 flows through a pipe 5 which runs along the length of the turbines 4 and the combustion chamber 2 twice in order to reach the heat exchanger 1 with the sole advantage of avoiding any modification to the exhaust of the turbine engine; in the second design, both the compressed gases and the exhaust gases must be diverted respectively by way of a pipe 6 similar to that in FIG. 7 and by a pipe 5 similar to that in FIG. 6. It is noted that the pipes 5 and 6 also have numerous direction changes and bends, which are responsible for head losses similarly to the long lengths thereof.

BRIEF SUMMARY OF THE INVENTION

The subject matter of the invention is an arrangement of turboshaft engines which is firstly capable of taking better advantage of the heat exchange characterising these gas stream heat recuperation methods, by minimising the gas pipe elongations required by the heat exchanger, the head losses and the corresponding increases in weight and overall dimensions. By reducing the length, complexity and weight of the gas pipes compared to conventional recuperated turboshaft engine configurations such as those shown in FIGS. 6 to 8, several advantages can be identified: reduced overall development costs, reduced overall weight and dimensions, and improved performance levels through the increase in thermal efficiency of the cycle.

The invention also exploits the supply of energy from the turboshaft engines by a compact and simple device, which is particularly useful in cramped environments such as helicopters.

In a general form, the invention firstly comprises two turboshaft engines, each of which comprises a cold section comprising one or more axial-flow or centrifugal-flow compressors, which may or may not be mechanically linked, upstream of a combustion chamber and a hot section comprising one or more axial-flow or inward-flow turbines, downstream of the combustion chamber, characterised in that the turboshaft engines are coupled by two heat exchangers, a first of the heat exchangers bringing an output airflow from the cold section of a first of the turboshaft engines into a heat exchanging relationship with an output gas stream from the hot section of a second of the turboshaft engines, and a second of the heat exchangers bringing an output gas stream from the hot section of the first of the turboshaft engines into a heat exchanging relationship with an output airflow from the cold section of the second of the turboshaft engines.

Moreover, the rotational axes of the turboshaft engines are parallel and the directions of stream flow along the turboshaft engines are opposite, each of the turboshaft engines comprises a power take-off device taking power from the turboshaft engines, and the invention is characterised in that it comprises a drive shaft connected to each of the power take-off devices by a respective mechanical transmission, each comprising a transmission shaft, the transmission shafts being in the continuation of one another and in that the drive shaft extends between the transmission shafts and between the main parts of the turboshaft engines in a direction that is perpendicular to the turboshaft engines.

Instead of causing heat exchange to take place between two successive portions of the same gas stream passing through a turboshaft engine, this exchange takes place between adjacent and interwoven turboshaft engines. This arrangement involves very small changes to the constitution of the turboshaft engines and thus entails shorter elongations of the gas paths and reduced head losses. The overall dimensions of the system formed by the two turboshaft engines are reduced, whereby the turboshaft engines that are thermally coupled to one another are also adjacent. Compared to turboshaft engines that do not include heat recuperation, fuel consumption savings of 18% to 20% for example can be expected in practice, which are better than those of the devices according to FIGS. 6 to 8 (14% to 18% with conventional heat exchangers).

The cold section portion of each of the turboshaft engines where the heat exchanger is installed can correspond to an area located downstream of a last of the compressors—in particular a high-pressure compressor—in the fluid flow direction and adjacent to the combustion chamber, and the corresponding hot section portion of each of the turboshaft engines can correspond to an exhaust downstream of a last of the turbines.

According to one important possibility, each of the turboshaft engines can comprise a free turbine in the hot section, without any mechanical link to the cold section, however comprising a power take-off shaft opening to the outside, which allows mechanical power to be extracted from the combustion gases. A greater operational independence is thus achieved between the turboshaft engines, especially when the power take-off means lead to a shaft or another output mechanism common to the two turboshaft engines, since the driving of this output mechanism remains possible, even if, for example, one of the turboshaft engines is stopped.

The arrangement of the invention is thus exploited in a configuration further comprising a drive shaft connected to each of the power take-off means of the free turbines by a respective mechanical transmission, and which thus allows the power outputs obtained by these free turbines to be grouped together.

One important application that can be considered for the invention is that of helicopter propulsion systems, whereby the output shaft of the arrangement is the shaft carrying the lift propeller. The device thus occupies a very small space inside the helicopter and imposes no or very few layout limitations. A particularly compact arrangement of the device is thus obtained.

BRIEF DESCRIPTION OF THE SEVERAL VIEWS OF THE DRAWINGS

The different aspects, features and advantages of the invention will be better understood upon reading the detailed description of some of the embodiments thereof, which do not exclude others, given with reference to the following figures.

DETAILED DESCRIPTION OF THE INVENTION

Figure 1:
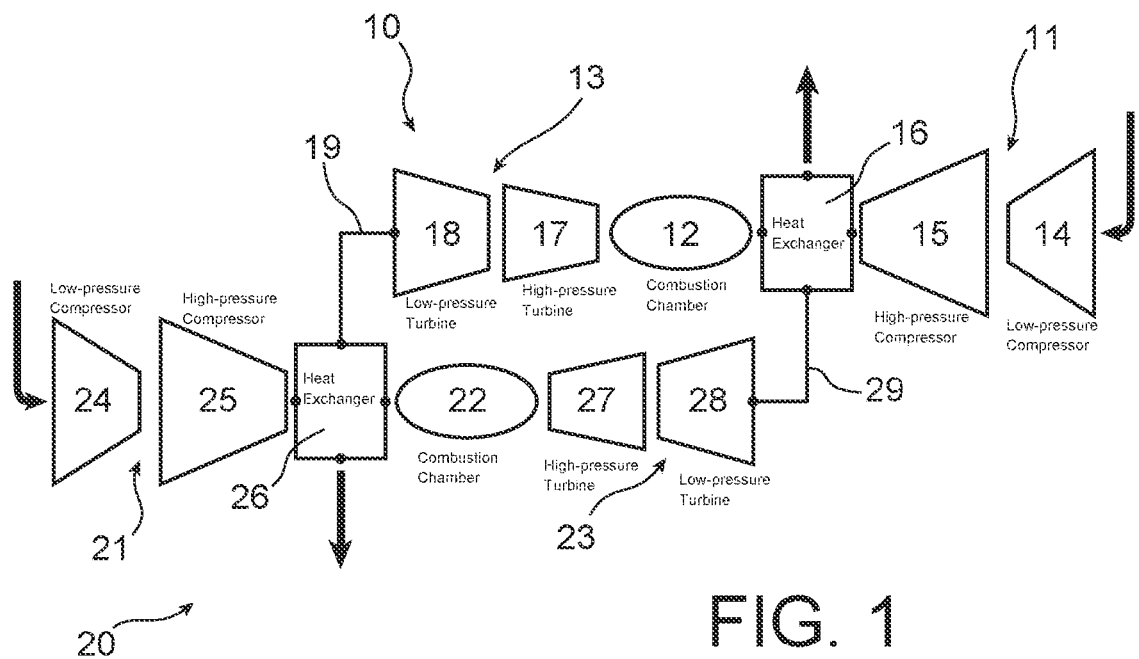
FIG. 1 is a diagrammatic view of the invention.

FIG. 1 is a general view of the invention. It shows two turboshaft engines 10 and 20, each of which comprises a cold section 11 or 21 upstream of a combustion chamber 12 or 22, and a hot section 13 or 23 downstream thereof. The cold sections 11 and 21 conventionally comprise compressors (in this case two compressors: one low-pressure compressor 14 or 24 and one high-pressure compressor 15 or 25), in addition to a heat exchanger 16 or 26; and the hot sections 13 and 23 comprise a high-pressure turbine 17 or 27, and a low-pressure turbine 18 or 28 downstream thereof. The cold sections 11 and 21, the hot sections 13 and 23 and the combustion chambers 12 and 22 form what is referred to as the main parts of the turboshaft engines 10 and 20.

The main parts of the turboshaft engines 10 and 20 are rectilinear, positioned side by side, in parallel but with gas streams flowing in opposite directions, and with an axial offset such that the combustion chamber 12 and/or 22 of each thereof extends essentially in front of the low-pressure turbine 28 or 18 of the other turboshaft engine 20 or 10. The exhausts, downstream of the last turbines, can thus be provided with bent pipes 19 and 29 which, by crossing the other turboshaft engine 20 or 10, pass the hot gases originating from the low-pressure turbines 18 and 28 through the heat exchanger 26 or 16 of the other turboshaft engine 20 or 10 and thus allow a large part of the heat thereof to be transferred to the cold streams entering the combustion chamber 22 or 12. The bent pipes 19 and 29 are short and, by imposing a simple change in the direction of the gases thanks to the single bend, result in low additional head losses.

This arrangement can be applied to electric power turbogeneration, which could be used in vehicles such as aircraft or land vehicles, in conjunction with a conventional drive system for propulsion. This application is described in FIG. 2. Each of the turboshaft engines 10 and 20 already described are thus used to drive an electric generator 30 or 31 by means of a device comprising a free turbine 32 or 33 in the bent pipe 19 or 29, immediately downstream of the low-pressure turbine 18 or 28 and upstream of the heat exchanger 16 or 26, and which drives a power take-off shaft 34 or 35 which leads to the electric generator 30 or 31. The free turbines 32 and 33, which in this case are the last turbines of turboshaft engines 10 and 20, are so called because they are devoid of any mechanical link with the other parts of the rotors of the turboshaft engines: in particular, they are linked neither to the other turbines, nor to the compressors. Most of the gas pressure energy is thus recuperated in this manner. As mentioned hereinabove, a large part of the heat energy thereof is recuperated in the heat exchangers 16 and 26 in order to improve the efficiency of the turboshaft engines 10 and 20. Other power take-off means can be considered, such as gearings, or means placed elsewhere on the turboshaft engines 10 and 20, which would, for example, exit laterally therefrom rather than in the continuation of the shafts connecting the turbines to the compressors.

Figure 2:
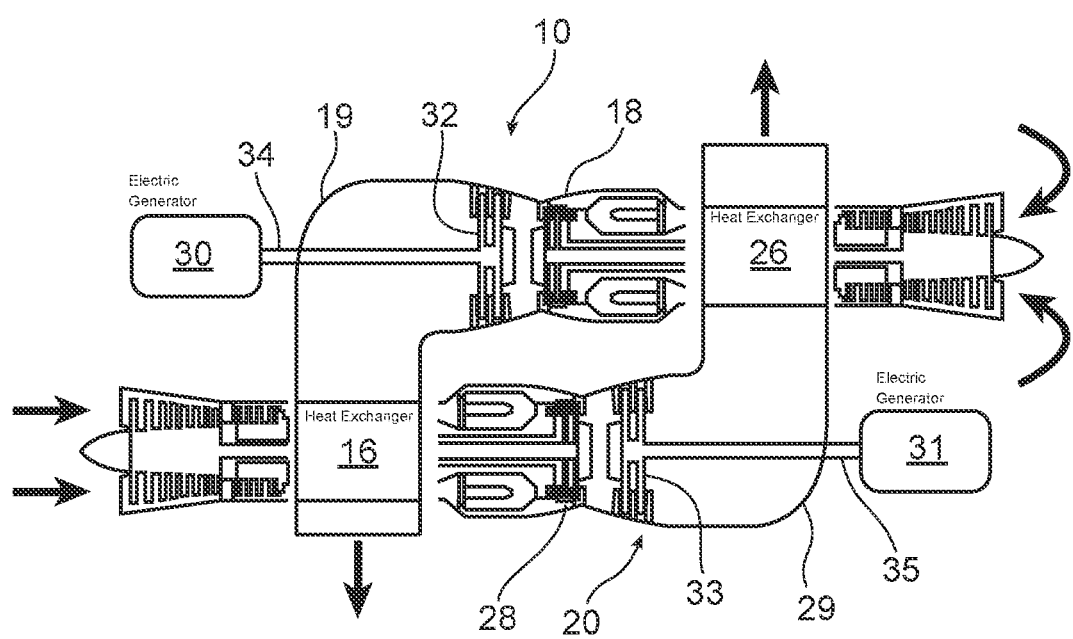
FIG. 2 shows a first possible embodiment thereof.
Figure 2A:
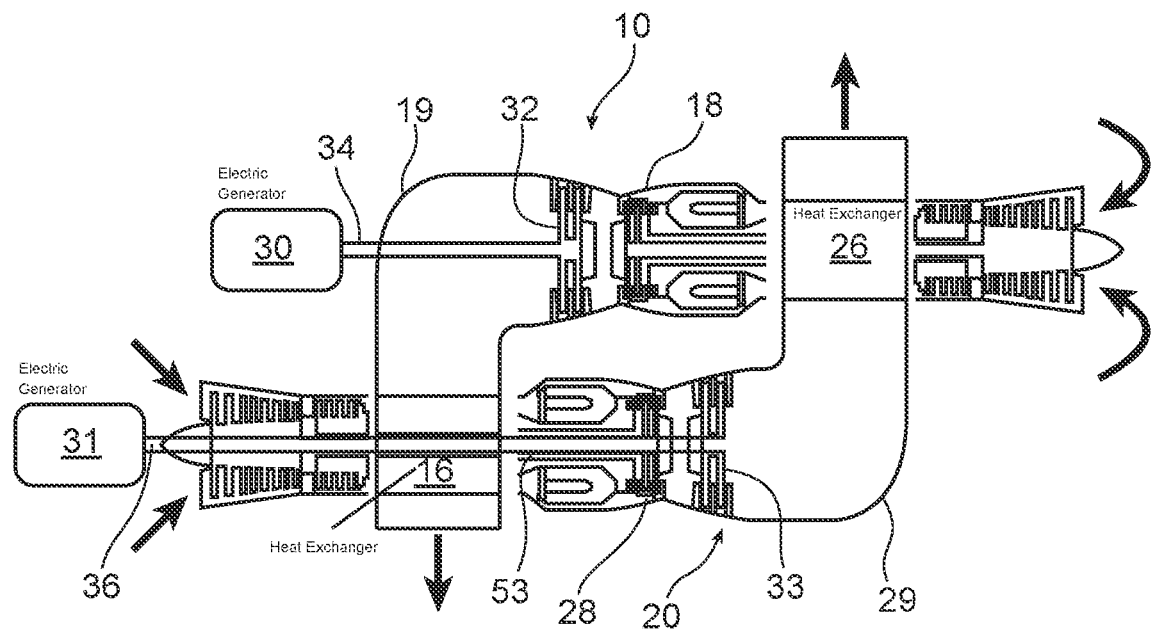
FIGS. 2A, 2B and 2C show certain possible alternative embodiments.

FIG. 2A shows an alternative embodiment whereby the power take-off shafts are not directed in opposite directions from the free turbines 32 or 33, but instead in the same direction, where one thereof, given the reference numeral 36 instead of 35, passes through the turboshaft engine 20 with which it is associated by extending within a central clearance 53 thereof, which passes through the entire rotor thereof; the charges 30 and 31 can thus be neighbouring.

Figure 2B:
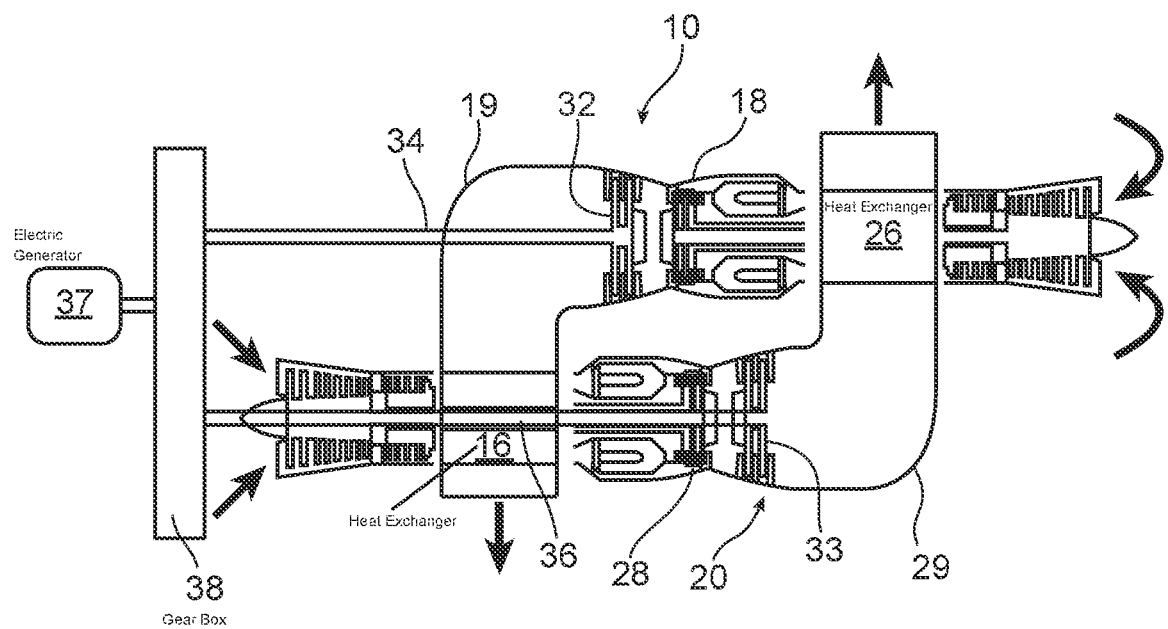
Figure 2C:
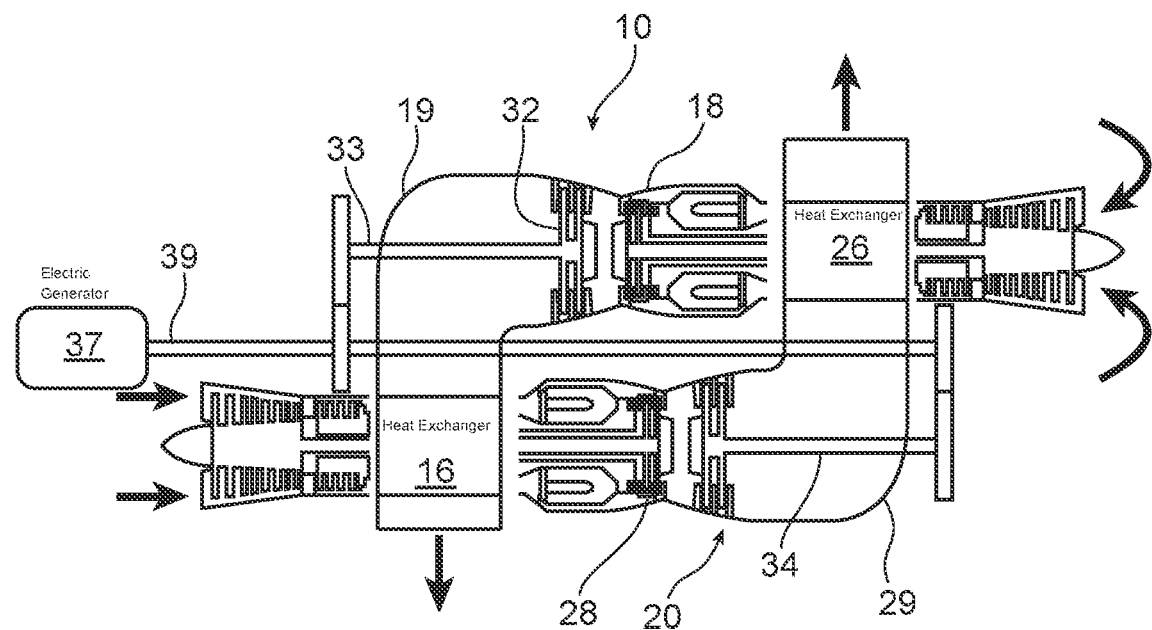

One evolution of this design, shown in FIG. 2B, would consist of replacing the charges 30 and 31 by a single charge 37, connected to the two power take-off shafts 34 and 36 by a gear box 38 so as to capture the power transmitted by these two shafts at the same time. FIG. 2C shows an alternative embodiment, wherein the power take-off shafts 34 and 35 are those shown in FIG. 2, but are both connected to a single output shaft 39 of a single charge 37 by spur gearings, or other power transmission members, spaced apart on this output shaft 39. Such an arrangement having two spur gearings could be adapted for the gearbox 38.

Figure 3:
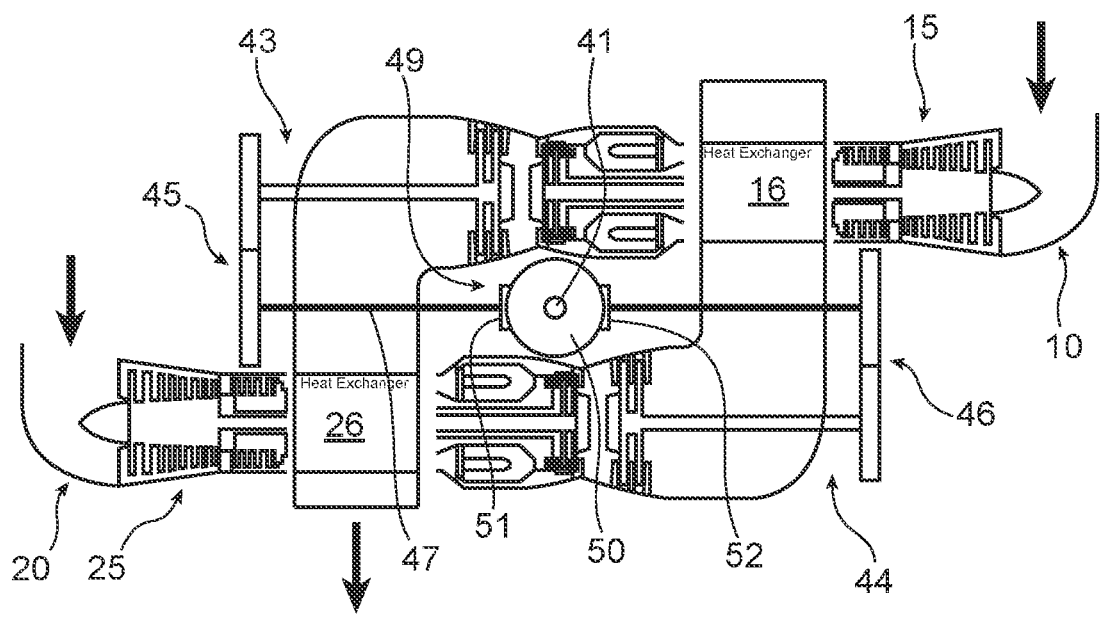
FIGS. 3, 4 and 5 show a second embodiment, respectively alone and from overhead and side views within a helicopter.
Figure 4:
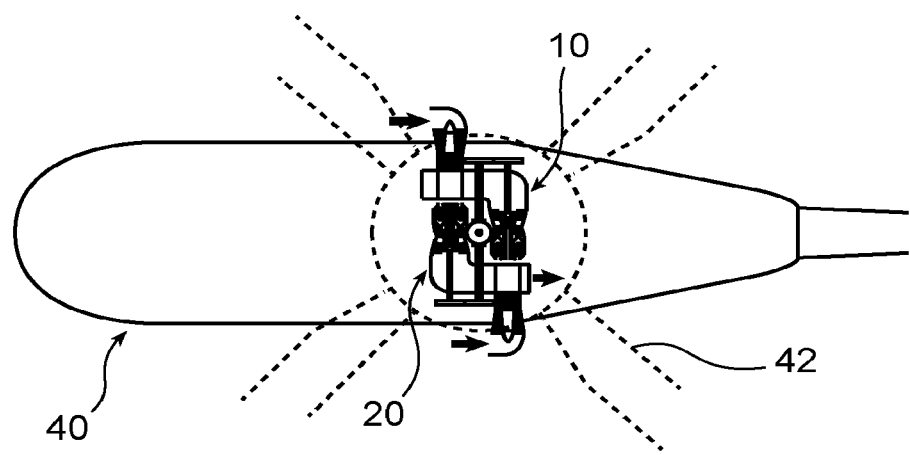
Figure 5:
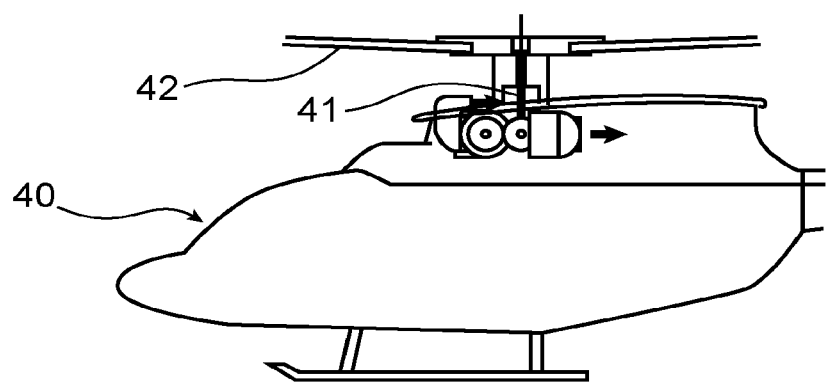
Figure 6:
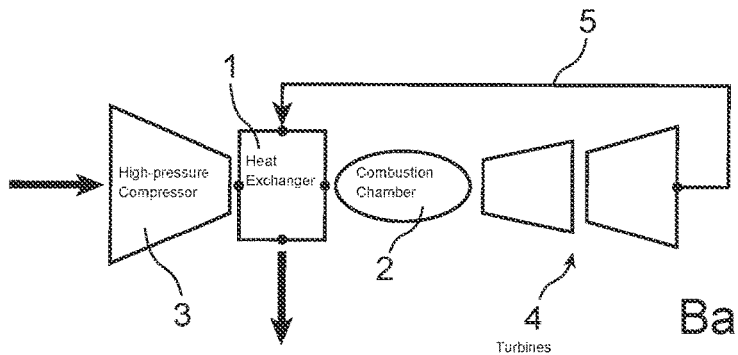
FIGS. 6, 7 and 8 described hereinabove show known embodiments of turboshaft engines with an integrated heat exchanger.
Figure 7:
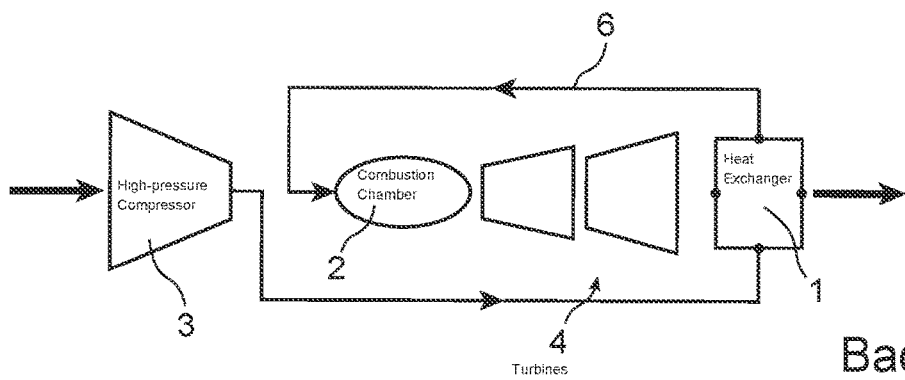
Figure 8:
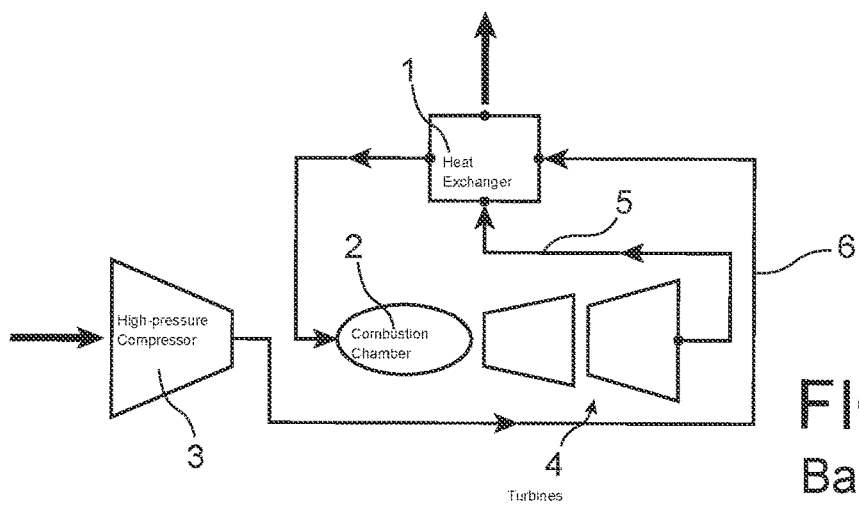

One characteristic embodiment of the invention will now be described with reference to FIGS. 3, 4 and 5. The device is applied in this case to the lift and propulsion of a helicopter 40. The turboshaft engines 10 and 20 are placed directly underneath the ceiling of the passenger compartment of the vehicle, surrounding the shaft 41 of the lift propeller 42 above the passenger compartment. As shown in FIG. 2, free turbines 32 and 33 are located in each of the bent pipes 19 and 29 of the turboshaft engines 10 and 20, and power take-off shafts 34 and 35 end outside of the turboshaft engines 10 and 20 and through which the power captured by the free turbines 32 and 33 can be collected. This is achieved by way of transmissions 43 and 44, each comprising, from the respective power take-off shaft 34 or 35, a spur gearing 45 or 46, a transmission shaft 47 or 48 and a bevel gearing 49 common to the two transmissions 43 and 44 and rigidly connected to the propeller shaft 41. The power take-off shafts 34 and 35 are parallel to one another and coaxial to the main parts of the turboshaft engines 10 and 20, upstream of the bent pipes 19 and 20, and to the shafts driving the compressors and the turbines as far as the low-pressure turbine 18. The transmission shafts 47 and 48 are parallel to the power take-off shafts 34 and 35 and extend between one another and in the continuation of one another, as far as a central region of the device that surrounds the turboshaft engines 10 and 20. The propeller shaft 41 passes into this central region by extending perpendicularly to the main plane wherein the turboshaft engines 10 and 20 extend (this plane is horizontal in the present application for a helicopter, and the propeller shaft 41 is vertical when the helicopter is not inclined). The bevel gearing 49 comprises a wheel 50 rotating the propeller shaft 41, and two toothed pinions 51 and 52 integral with the transmission shafts 47 and 48 and both meshing with the wheel 50. Thanks to this arrangement, the propeller shaft passes between the turboshaft engines 10 and 20 and in particular the main parts thereof, between the bent pipes 19 and 29, and between the axes of the power take-off shafts 34 and 35; it extends in a direction perpendicular to these components, which are all horizontal. The arrangement is thus very compact. It can be entirely symmetric, whereby the transmission shafts 47 and 48 are in the continuation of one another; they thus rotate in opposite directions of rotation to one another, as do the power take-off shafts 34 and 35 and the rotors of the turboshaft engines 10 and 20; this is compatible with similar turboshaft engines 10 and 20 since they are oriented in opposite directions.

The start-up of the turboshaft engines 10 and 20 causes the free turbines 32 and 33, and the transmission shafts 47 and 48 to rotate such that the transmissions 43 and 44 jointly drive the propeller shaft 41. In the event that one of the two turboshaft engines 10 and 20 should fail, the device allows the power required by the helicopter to be maintained, however with a lower thermal efficiency than for nominal operation. In such a critical situation, the savings procured by the remaining turboshaft engine are of no import.

One advantage specific to this arrangement is the possibility of using the defective turboshaft engine, even if a fuel flow thereto is cut off. With reference to FIG. 2, in the event of a malfunction on the turboshaft engine 20 and if the fuel flow thereto is cut off, the turboshaft engine 10 still operates at full power. As a result, in the heat exchanger 16, heat exchange takes place between the hot stream exiting the turbine 32 and the cold stream from the turboshaft engine 20 (a very low mass flow rate). As a result, the turboshaft engine 20 will only be set in motion by the energy transfer in the heat exchanger 16. Depending on the performance levels of the heat exchanger 16 (in terms of efficiency and head loss), the free turbine 33 can be made to generate useful mechanical power if it is not slowed by a dedicated device, without burning fuel in the chamber of the turboshaft engine 20. In this degraded operating mode, the turboshaft engine 20 becomes an auxiliary energy recuperation system of the turboshaft engine 10. Thus, the device of the invention can operate in multi-rotor or single-rotor mode to propel the helicopter 40.

The aforementioned embodiment would be suitable for other applications that differ from the propulsion of a helicopter and the generation of electrical energy.

The turboshaft engines of the different embodiments can be similar, as shown herein, or different.

The invention claimed is:

1. An arrangement of turboshaft engines, comprising:
    first and second turboshaft engines, each of the first and second turboshaft engines comprises a cold section comprising one or more axial-flow or centrifugal-flow compressors upstream of a combustion chamber and a hot section comprising one or more axial-flow or inward-flow turbines, downstream of the combustion chamber,
    wherein the first and second turboshaft engines are coupled by first and second heat exchangers, the first heat exchanger bringing an output airflow from the cold section of a first of the first turboshaft engine into a heat exchanging relationship with an output gas stream from the hot section of the second turboshaft engine, and the second heat exchanger bringing an output gas stream from the hot section of the first turboshaft engine into a heat exchanging relationship with an output airflow from the cold section of the second turboshaft engine, rotational axes of the first and second turboshaft engines are parallel and directions of stream flow along the first and second turboshaft engines are opposite, each of the first and second turboshaft engines comprises a power take-off device taking power from the turboshaft engines,
    wherein each of the first and second turboshaft engines comprises a free turbine in the hot section, without any mechanical link with the cold section,
    wherein the free turbines are each connected to a respective power take-off shaft which ends outside of the first and second turboshaft engines,
    wherein each of the power take-off shafts is connected to a respective transmission shaft through a respective transmission,
    wherein the transmission shafts are both connected to a same drive shaft,
    wherein the drive shaft extends in a direction that is perpendicular to and passes between the first and second turboshaft engines,
    wherein the transmission shafts extend between and are parallel to the power take-off shafts and are in extension to each other, and
    wherein the drive shaft extends between ends of the transmission shafts that are opposite to the transmissions, and is connected to said ends.

2. The arrangement of turboshaft engines according to claim 1, wherein the arrangement constitutes a helicopter powerplant wherein the first and second turboshaft engines are placed horizontally beneath a ceiling of the helicopter and the drive shaft is a propeller shaft.

3. The arrangement of the turboshaft engines according to claim 1, wherein each of the heat exchangers is placed between a last of the compressors and the combustion chamber of one of the first and second turboshaft engines, and at an exhaust downstream of a last of the turbines of the other of the first and second turboshaft engines.

4. The arrangement of turboshaft engines according to claim L wherein exhausts of the first and second turboshaft engines are formed by bent pipes having a single bend, the bent pipe of one of the first and second turboshaft engines crossing the bent pipe of the other of the first and second turboshaft engines.

5. The arrangement of turboshaft engines according to claim 1, wherein the power take-off shafts are parallel with opposite directions of rotation and with areas of power transmission that are spatially offset from one another.

6. The arrangement of turboshaft engines according to claim 1, further comprising a bevel gearing connecting the transmission shafts to the drive shaft and comprising a wheel rotating the drive shaft, and two toothed pinions both meshing with the wheel and respectively connected to said ends of the transmission shafts.

7. The arrangement of turboshaft engines according to claim 2, wherein the transmissions each includes a spur gearing.

* * * * *